(12) United States Patent
Keita et al.

(10) Patent No.: US 6,844,415 B1
(45) Date of Patent: Jan. 18, 2005

(54) POLYMERIZABLE COMPOSITIONS FOR MAKING THIO CONTAINING RESINS INCLUDING A SALT CATALYST AND PROCESS FOR MAKING THIO CONTAINING

(75) Inventors: Gabriel Keita, Oldsmar, FL (US); Pamela Ann McClimans, Safety Harbor, FL (US); Steve Weber, Clearwater, FL (US); Yassin Turshani, Largo, FL (US)

(73) Assignee: Essilor International-Compagnie General D'Optique, Charenton Cedix (FR)

( * ) Notice: Subject to any disclaimer, the term of this patent is extended or adjusted under 35 U.S.C. 154(b) by 269 days.

(21) Appl. No.: 09/395,082

(22) Filed: Jan. 31, 2003

Related U.S. Application Data

(63) Continuation-in-part of application No. 09/182,577, filed on Oct. 29, 1998, now Pat. No. 5,973,098.

(51) Int. Cl.[7] .................. C08G 18/00; C08G 18/06; C08G 18/08; C08G 18/16
(52) U.S. Cl. .................. 528/65; 528/44; 528/85; 528/373; 528/388
(58) Field of Search .................. 528/65, 44, 85, 528/373, 388

(56) References Cited

U.S. PATENT DOCUMENTS 5,973,098 A * 10/1999 Keita et al.

* cited by examiner

Primary Examiner—Duc Truong
(74) Attorney, Agent, or Firm—O'Keefe, Egan & Peterman, LLP

(57) ABSTRACT

The polymerizable compositions comprise:

A) at least one polyiso(thio)cyanate monomer, and at least one polythiol monomer; or at least one episulfide compound and optionally one or more compounds having two or more functional groups capable of reacting with episulfide groups; and B) as polymerization catalyst, an effective amount of a salt of formula $$M_m^{P+} Y_n^-$$

$Y^-$ is an anion such as the corresponding acid YH has a pKa fulfilling the condition $0.5 \leq pKa \leq 14$ with the proviso that when the polymerizable compositions comprise an episulfide compound and $M^{P+}$ is an ammonium group, the polymerizable composition also comprises an electro-donor compound.

Application to the fabrication of optical articles, such as lenses.

34 Claims, No Drawings

POLYMERIZABLE COMPOSITIONS FOR MAKING THIO CONTAINING RESINS INCLUDING A SALT CATALYST AND PROCESS FOR MAKING THIO CONTAINING

This application is a continuation-in-part application of application Ser. No. 09/182,577, filed Oct. 29, 1998, now U.S. Pat. No. 5,973,098, incorporated herein by reference.

BACKGROUND OF THE INVENTION

(1) Field of the Invention

The present invention relates to polymerizable compositions for making polymerized thio containing resins, and in particular fast curing compositions at room temperature as well as to a polymerization process for making such thio containing resins and especially a room temperature polymerization process.

The polymerizable compositions and the polymerization process of the invention are particularly useful for making optical articles such as lenses, prisms, optical fibers, filters or for making different types of substrates, such as information recording substrates.

The polymerizable compositions and the polymerization process of the invention are also specifically suited for making various coatings and in particular coatings for optical applications.

(2) Description of the Prior Art

Plastic materials are widely used in the optical field and particularly in the opthalmic field for their lightness, high impact resistance and tintable capability by immersion in a bath containing an organic dye.

Optically transparent plastic materials having a high refractive index $n_D=1.6$ or even higher have been developped recently which renders it possible to manufacture optical articles such as lenses of lower thickness for an equivalent corrective power (optical power).

A class of such materials is comprised of polythiourethane resins.

Polythiourethane resins for making optical lenses are described in U.S. Pat. No. 4,775,733. In this document, the polythiourethane resins are polymerized from polymerizable compositions comprising a polyisocyanate and a polythiol in the presence of a polymerization catalyst. The catalysts are tin complexes such as dibutyl tin dilaurate and the polymerization is a thermal polymerization.

Document JP-02166158A discloses a process for making polyurethane resin moulding which comprises adding in polyether polyol a thiocyanate salt such as ammonium thiocyanate or sodium thiocyanate, a crosslinking agent, catalysts and other additives and thereafter mixing with denatured diphenylmethane diisocyanate, filling into a reactant tank and injecting into a mould with heating. The catalysts are comprised of a dipropyleneglycol solution of triethylamine and dibutylene tin dilaurate.

Another class of useful materials comprises the resins obtained by polymerization of a composition of polymerizable monomers including one or more polymerizable episulfide compounds.

Episulfide compounds and their polymerization are disclosed in EP-A-761 665 and EP-A-785 194.

Unfortunately, the polymerization of these polymerizable compositions needs a long thermal cycle, generally between 8 hours to several days in order to obtain fully polymerized articles without striation or strain.

SUMMARY OF THE INVENTION

Thus, the aim of the present invention is to provide polymerizable compositions for making thio containing resins which are thermally polymerizable and even polymerizable at room temperature in a short time cycle.

The invention also concerns a polymerization process for making thio containing resins which necessitates shorter time cycle than the prior art processes.

The invention further concerns optical articles such as lenses made of the thio containing resins resulting from the polymerization of the polymerizable compositions.

It has now been discovered that, by using an effective amount of a salt of a specific class of salts as part of the catalyst or preferably as the sole catalyst in polymerizable compositions for making thio containing resins, it was possible to use very short polymerization cycles while still obtaining a polymerized resin which is optically transparent and free of striations and having good mechanical, scratch and heat resistance properties.

According to the present invention, there is provided thermally or room temperature polymerizable compositions for making thio containing resins comprising:

A) at least one polyisocyanate or polyisothiocyanate monomer, and at least one polythiol monomer; or at least one episulfide compound bearing episulfide groups and optionally one or more compound(s) having two or more functional groups capable of reacting with episulfide groups; and B) a polymerization catalyst, wherein the polymerization catalyst comprises an effective amount of at least one salt of formula:

$$M_m^{P+} + Y_n^-$$

wherein
$M^{P+}$ is a cation selected from the group consisting of alkaline metals, alkaline earth metals, transitions metals and ammonium groups of formula $NR^+_4$ in which R is an alkyl radical,
$Y^-$ is an anion such as the corresponding acid YH has a pKa fulfilling the condition $0.5 \leq pKa \leq 14$ with the proviso that when the polymerizable compositions comprise an episulfide compound and $M^{P+}$ is an ammonium group, the polymerizable composition also comprises an electro-donor compound,
p is the valency of the cation, and
n=m×p.

Preferably, the catalyst consists solely in the salt or a mixture of these salts.

DETAILED DESCRIPTION OF THE INVENTION AND PREFERRED EMBODIMENTS

The preferred metallic cation of the salts are $Li^+$, $Na^+$, $K^+$, $Rb^+$, $Mg^{2+}$, $Ca^{2+}$, $Ba^{2+}$ and $Al^{3+}$. The particularly preferred metallic cations are $Li^+$, $Na^+$ and $K^+$ due to their absence of color and solubility in the composition. Transition metals are less preferred because the salts thereof lead to coloured compositions and therefore coloured polymerized resins.

The preferred $NR_4^+$ groups are those in which R is a $C_1$–$C_8$ alkyl radical and more preferably, a methyl, ethyl, propyl, butyl or hexyl radical.

The salt shall be used in the polymerizable composition in an effective amount, i.e. an amount sufficient to promote the thermal or room temperature polymerization of the composition.

Generally, the salt will be present in amounts ranging, based on the total weight of the polymerizable monomers, from 5 to 1000 parts per million (ppm), preferably 10 to 500 ppm and more preferably 40 to 100 ppm.

Preferably, $Y^-$ is an anion such as the corresponding acid YH which fulfills the condition $0.5 \leq pka \leq 10$ and more preferably $0.5 \leq pKa \leq 8$.

Preferably, the anion $Y^-$ is selected from the group consisting of thiocyanate, carboxylate, thiocarboxylate, acetylacetonate, diketone, acetoacetic ester, malonic ester, cyanoacetic ester, ketonitrile and anion of formula $RS^-$ wherein R is a substituted or non-substituted alkyl group or phenyl group.

Preferably, the alkyl group is a $C_1$–$C_6$ alkyl group, such as methyl, ethyl and propyl.

The preferred anions $Y^-$ are $SCN^-$, acetylacetonate, acetate, thioacetate, formate and benzoate.

The polyisocyanate or polyisothiocyanate monomers of the compositions of the invention have two or more isocyanate or isothiocyanate functions per molecule.

The preferred polyisocyanate and polyisothiocyanate monomers are those having two or three isocyanate or isothiocyanate functions.

The preferred polyisocyanate and polyisothiocyanate monomers are those having the formulae:

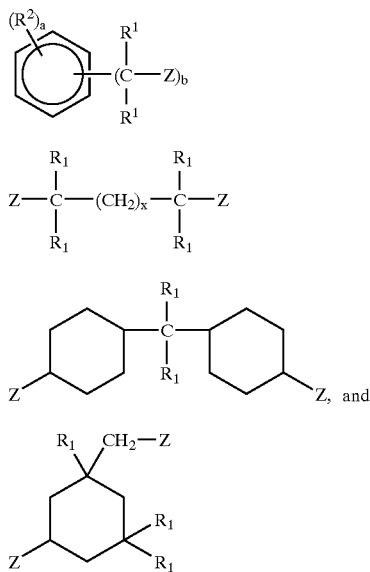

wherein
- $R^1$ is independently H or a $C_1$–$C_5$ alkyl group, preferably $CH_3$ or $C_2H_5$;
- $R^2$ is H, an halogen, preferably Cl or Br, or a $C_1$–$C_5$ alkyl group, preferably $CH_3$ or $C_2H_5$;
- Z is —N=C=O or —N=C=S, preferably —N=C=O;
- a is an integer ranging from 1 to 4, b is an integer ranging from 2 to 4 and $a+b \leq 6$; and
- x is an integer from 1 to 10, preferably 1 to 6.

Among the preferred polyiso(thio)cyanate monomers there may be cited tolylene diiso(thio)cyanate, phenylene diiso(thio)cyanate, ethylphenylene diiso(thio)cyanate, isopropyl phenylene diiso(thio)cyanate, dimethylphenylene diiso(thio)cyanate, diethylphenylene diiso(thio)cyanate, diisopropylphenylene diiso(thio)cyanate, trimethylbenzyl triiso(thio)cyanate, xylylene diiso(thio)cyanate, benzyl triiso(thio)cyanate, 4,4'-diphenyl methane diiso(thio) cyanate, naphtalene diiso(thio)cyanate, isophorone diiso (thio)cyanate, bis(iso(thio)cyanate methyl) cyclohexane, hexamethylene diiso(thio)cyanate and dicyclohexylmethane diiso(thio)cyanate.

There can be used a single polyiso(thio)cyanate monomer or a mixture thereof.

The amount of polyiso(thio)cyanate present in the polymerizable compositions of the invention ranges generally from 30 to 70%, preferably between 40 and 60% by weight based on the total weight of the polymerizable monomers present in the composition.

The polythiol monomer may be any suitable polythiol having two or more, preferably two or three, thiol functions.

The polythiol monomers can be represented by formula:

$$R'(SH)_{n'} \qquad (VI)$$

in which n' is an integer from 2 to 6 and preferably 2 to 3, and R' is an organic group of valency equal to n'.

Useful polythiol monomers are those disclosed in EP-A-394 495 and U.S. Pat. No. 4,775,733 and the polythiols corresponding to the following formulae:

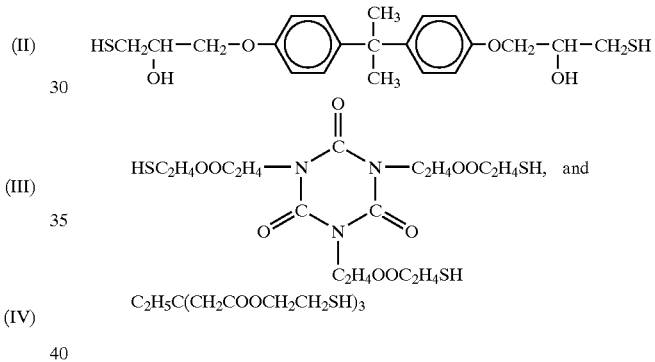

$C_2H_5C(CH_2COOCH_2CH_2SH)_3$

Among the preferred polythiol monomers there may be cited aliphatic polythiols such as pentaerythritol tetrakis mercaptoproprionate, 1-(1'mercaptoethylthio)-2,3-dimercaptopropane, 1-(2'-mercaptopropylthio)-2,3-dimercaptopropane, 1-(-3' mercaptopropylthio)-2,3 dimercaptopropane, 1-(-4' mercaptobutylthio)-2,3 dimercaptopropane, 1-(5' mercaptopentylthio)-2,3 dimercapto-propane, 1-(6'-mercaptohexylthio)-2,3-dimercaptopropane, 1,2-bis(-4'-mercaptobutylthio)-3-mercaptopropane, 1,2-bis (-5' mercaptopentylthio)-3-mercaptopropane, 1,2-bis(-6'-mercaptopentylthio)-3-mercaptopropane, 1,2,3-tris(mercaptomethylthio)propane, 1,2,3-tris(-3'-mercaptopropylthio)propane, 1,2,3-tris(-2'-mercaptoethylthio)propane, 1,2,3-tris(-4'-mercaptobutylthio)propane, 1,2,3-tris(-6'-mercaptohexylthio)propane, methanedithiol, 1,2-ethanedithiol, 1,1 propanedithiol, 1,2-propanedithiol, 1,3-propanedithiol, 2,2-propanedithiol, 1,6-hexanethiol-1,2,3-propanetrithiol, and 1,2-bis(-2'-mercaptoethylthio)-3-mercaptopropane.

Polythiol monomers usually represent 30 to 70%, preferably 40 to 60% of the total weight of the polymerizable monomers present in the compositions.

In general, the molar ratio of NCO/SH ranges between 0.8 and 1.2.

The preferred episulfide compounds for use in these compositions of the invention are those described in the above cited European patent applications EP-A-761 665 and 785 194. These episulfide compounds have two or more moieties of formula:

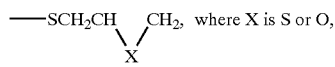

at least one of these moities being an episulfide group.

The polymerizable compositions of the invention may include up to 100% by weight of one or more of the episulfide compounds or the polymerizable compositions may comprise one or more episulfide compounds and one or more copolymerizable monomers.

Among the preferred copolymerizable monomers are the polythiol monomers described above.

For the composition containing the episulfide compound, the reactivity increases with the cation size of the salt (K salts are more reactive than sodium salts which are more reactive than lithium salts).

The polymerizable compositions of the present invention preferably comprise a solvent for promoting the dissolution of the salt catalyst within the polythiol monomer.

Any polar organic solvent can be used such as acetonitrile, tetrahydrofurane or dioxane. However, to avoid bubble generation, it is preferred to use a reactive solvent containing a hydroxyl function and most preferably a hydroxyl containing solvent further including one double bond capable of reacting with the thiol functions and one hydrogen labile function capable of reacting with the iso (thio)cyanate functions. Suitable solvents are methanol, ethanol, acetone, acetonitrile and 3-methyl-2-butene-1ol.

The amount of solvent is generally kept below 2% by weight, based on the total weight of the polymerizable monomers present, and preferably between 0 and 0.5% by weight, to avoid haze and bubbling.

In a preferred embodiment, and necessarily when compositions include an episulfide monomer and ammonium salt as catalayst, the polymerizable compositions according to the present invention further include at least one electro-donor compound. The electro-donor compounds are preferably selected from the group consisting of acetonitrile compounds, amide compounds, sulfones, sulfoxides, trialkylphosphites, triarylphosphites, nitro compounds, ethyleneglycol ethers, crown ethers and kryptates.

Examples of acetonitrile compounds are N≡C—CH$_2$—C≡N and

in which
R is an alkyl group, preferably a $C_1$–$C_6$ alkyl group such as methyl, ethyl, propyl, butyl.

The amide compounds may be primary, secondary or tertiary amide compounds.

The trialkylphosphites and triarylphophites may be represented by formula:

in which R, R', R'" are either an alkyl group, preferably a $C_1$–$C_6$ alkyl group or an aryl group such as a phenyl group. Preferred are trialkylphosphites, for example $(C_2H_5O)_3P$.

Electro-donor compounds may also be selected from crown ethers and kryptates.

These cyclic molecules are usually chosen to exhibit a good compromise between the heteroatom or metal size and the "cage" size, i.e. between the number of heteroatoms and the size of the cycle.

The preferred crownethers and kryptates may be represented by the following formulae:

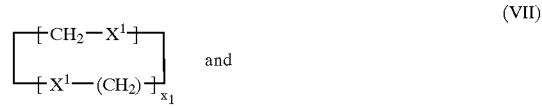

(VII)

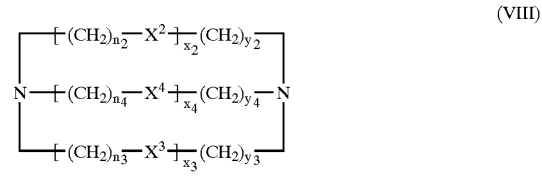

(VIII)

wherein $X^1$ represents O, S or NH, $x_1$ is an integer from 3 to 6, preferably from 3 to 4,
$X^2$, $X^3$ and $X^4$ represent O or S, $n_2$, $n_3$, $n_4$, $y_2$, $y_3$, $y_4$ are 2 or 3, and $x_2$, $x_3$, $x_4$, are 2 or 3.

Among the preferred crown ethers and kryptates there may be cited the following compounds:

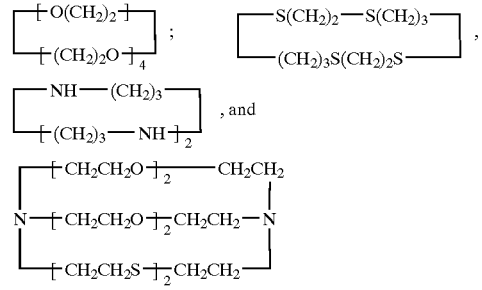

The electro-donor compounds are present, based on the total weight of the polymerizable monomers in amounts ranging from 0 to 5% by weight, preferably 0 to 1% by weight.

Preferred electro-donor compounds are crown-ethers, kryptates, trialkylphosphites and acetonitrile compounds.

Some acetonitrile compounds may be used both as solvent and electro-donor compound.

In general, electro-donor compounds stabilize the cation of the catalyst. They contribute to disociation of the anion/cation pair and thus increase the reactivity of the anion in the polymerization medium, and consequently the polymerization reaction.

These electro-donor compounds are especially effective when the polymerizable composition includes an episulfide (which has a realtively low reactivity) and lower reactive thiols such as:

(MDO)

The polymerizable compositions according to the invention may also include additives which are conventionally employed in polymerizable compositions intended for moulding optical articles, in particular ophthalmic lenses, in conventional proportions, namely inhibitors, dyes, UV absorbers, perfumes, deodorants, antioxidants, antiyellowing agents and release agents.

The perfumes allow the odour of the compositions to be masked, in particular during surfacing or routering operations.

In particular, usual UV absorbers such as those commercialized under the tradenames UV 5411®, UV 9®, Tinuvin400®, Tinuvin P® and Tinuvin 312® may be used in amounts generally up to 0.4% by weight of the total polymerizable monomers weight.

Also, the compositions of the invention preferably comprise a release agent in an amount up to 0.1% by weight of the total polymerizable monomers weight.

Among the release agents there may be cited mono and dialkyl phosphates, silicones, fluorinated hydrocarbon, fatty acids and ammonium salts. The preferred release agents are mono and dialkyl phosphates and mixtures thereof. Such release agents are disclosed inter alia in document U.S. Pat. Nos. 4,662,376, 4,975,328 and EP-271839.

In a particularly preferred embodiment, polymerizable composition of the present invention is in the form of a two component polymerizable composition, i.e. a composition which is formulated as two separate components which are mixed together just before use.

In that preferred two component embodiment, the composition comprises a first separate component or premix which contains the totality of the polyiso(thio)cyanate monomer, possibly, part or the totality of the polythiol monomer, and optionally the UV absorber and the mold release agent, and a second separate component or premix which comprises the thiocyanate salt catalyst, possibly part or the totality of the polythiol monomer, and optionally the solvent and the crown ether or kryptate.

In a particularly preferred two component embodiment of the composition of the present invention, the first premix comprises:

40–100 parts by weight of the polyiso(thio)cyanate monomer,
0–60 parts by weight of the polythiol monomer;
0–0.3 parts by weight of a UV absorber; and
0–0.2 parts by weight of an internal mold release agent; and the second premix comprises
0–100 parts by weight of the polythiol monomer;
0–1 part by weight of solvent;
0.001 to 0.01 part by weight of the salt catalyst; and
0–5 parts by weight of an electro-donor compound.

The compositions of the present invention are very reactive at room temperature, and a gel can be obtained within a polymerization time of 1 to 60 minutes, but in order to obtain striation free moulded articles, it is preferable to use a short gel time between 1 to 5 minutes.

Therefore, the invention also concerns a process for making cast optical article, such as lenses, without a pot life issue, by mixing the required amounts of each of the ingredients of a composition according to the invention as described above, just before casting, and in particular in the form of a two component composition.

Thus, the invention also concerns a process for making a cast polyurethane resin article, in particular an optical article such as a lens, which comprises:

preparing a first premix containing the totality of the polyiso(thio)cyanate monomer and, possibly, part or the totality of the polythiol monomer, and optionally a UV absorber and a mold release agent;

preparing a second premix containing the salt catalyst and, possibly, part or the totality of the polythiol monomer, and optionally a solvent and an electro-donor compound;

mixing the first premix and the second premix at room temperature in appropriate quantities;

filling a mold with the mixed quantities of first and second premix and maintaining at room temperature until a hard gel is formed; and, thereafter curing the filled mold in an oven at an elevated temperature until complete polymerization; and removing the cast article from the mold.

Generally, the weight ratio of the first premix to the second premix ranges from 2 to 10, preferably 4 to 10.

The mixing, which can be a mechanical or ultrasonic mixing, is generally effected at room temperature for a duration ranging from 10 to 180 seconds.

Gel formation inside the mold is effected at room temperature and has a duration ranging from 1 to 60 minutes, preferably 1 minute to less than 15 minutes and is generally about 10 minutes, although shorter gel time of 1 to 5 minutes may still be preferable.

Curing at elevated temperature in an oven, for example an air oven, is generally effected at a temperature ranging from 50 to 150° C. preferably 100 to 130° C. and lasts usually for 2 to 4 hours.

For example, the required amounts of premix 1 and premix 2 are filled inside two syringes. The syringe filing has been carried out with an electrical device or pneumatic device. By this way, the exact amounts of premix 1 and 2 can be easily adjusted and fixed for precise delivery.

The two premixes are then added inside a small reactor chamber and then mixed by magnetic or mechanical stirrer for less than 2 minutes. However, time of mixing usually ranges from 10 to 180 seconds. Static mixers, small reactor with magnetic bar or mechanical mixers, or screw mixers may be used. A slight vacuum may be used for bubbles removal if necessary.

After mixing, the monomer is then dispensed from the reactor, using pressurized inert gas to fill the mold assembly. The mold assembly is conventional and consists of a two part mold in glass, metal or plastic, with a sealing gasket and a pressure clip to maintain sealing.

Before being exposed to the thermal cycle to achieve full polymerization, the filled mold assembly stays at room temperature until hard gel formation, generally less than 15 minutes.

Then gasket is removed and filled assembly is cured in air oven at 120° C. for at least 2 hours.

A static mixer can be used instead of small reactor, however the striations are greater. By implementing the rotation of the static element, the mixing becomes very similar to a screw system and generally the result in terms of striation is very good.

Mixing by an ultrasonic system has also been used. In this case an adequate dosage (time intensity) resulting to a good compromise between kinetic acceleration, bubbles generation and mixing efficiency must be set-up.

Thereafter the lenses can be tinted, coated to improve the scratch resistance, and an antireflective treatment can also be added.

The present invention also concerns a cast polyurethane resin article and in particular an optical article such as a lens made of a composition according to the invention fully polymerized.

The following examples illustrate the present invention. In these examples, unless otherwise stated, all parts and percentages are by weight.

The performances of compositions and lenses were evaluated by the following procedure.

Gel time was measured by the time needed by exothermic process to reach 50° C. in a 50 g sample. Time given in the tables is in minutes.

Striation control on 6.00 bases lenses or vial samples with high intensity light box. +=no striation (optical quality); ++=medium (very light striations acceptable for optical use); +++=strong; ++++=very strong.

Aspect was evaluated by visual observation

"Water white" means transparency of optical quality.

EXAMPLE 1

To 56.5 g of tetrakis mercaptopropionate pentaerythrytol were added 0.005 g of lithium thiocyanate salt dissolve in 0.5 g of acetonitrile, and mixed.

Then the thiol solution prepared above is added to 43.5 g of

PTMP=Tetrakis mercaptopropionate pentaerythritol
XDI=Xylylene diisocyanate
MBOL=3-methyl-2-butene-1-ol
MDO=1,2-bis(2'-mercapto ethyl thio)-3 mercaptopropane

EXAMPLES 42–44

In the three following examples, two premixes were used in different ratios.

Premix 1 was made by mixing in the proportions indicated in table 2, xylylene diisocyanate, pentaerythrytol tetramercaptopropionate and UV 5411® in a flask.

In another flask, premix 2 was prepared by mixing the rest of the pentaerythritol tetramercaptopropionate, 3-methyl 2-butene-1-ol and lithium thyocyanate in the indicated proportions.

By means of a syringe pump, the right amount of each premixes was dispensed inside a reactor. The mixing took one minute and by pressure, the formulation is transferred inside a mould assembly. After 10 minutes at room temperature, a gel was formed and gasket was removed. The assembly was cured at 120° C. for 2 hours.

TABLE 1

|  | Thiol | g | Isocyanate | g | Solvent | g | Crown ether | g | Catalyst | ppm | Striation | Gel time (minutes) | Aspect |
|---|---|---|---|---|---|---|---|---|---|---|---|---|---|
| Example 1 | PTMP | 56.5 | XDI | 43.5 | Acetonitrile | 2 |  |  | KSCN | 20 | ++++ | 14 | water white |
| Example 2 | PTMP | 56.5 | XDI | 43.5 | Acetonitrile | 2 |  |  | KSCN | 40 | ++ | 4.25 | water white |
| Example 3 | PTMP | 56.5 | XDI | 43.5 | Acetonitrile | 2 |  |  | KSCN | 60 | + | 1.5 | water white |
| Example 4 | PTMP | 56.5 | XDI | 43.5 | Acetonitrile | 2 |  |  | KSCN | 80 | + | 1 | water white |
| Example 5 | PTMP | 56.5 | XDI | 43.5 | Acetonitrile | 2 |  |  | LiSCN | 20 | ++++ | >40 | water white |
| Example 6 | PTMP | 56.5 | XDI | 43.5 | Acetonitrile | 2 |  |  | LiSCN | 40 | +++ | 11.5 | water white |
| Example 7 | PTMP | 56.5 | XDI | 43.5 | Acetonitrile | 2 |  |  | LiSCN | 60 | +++ | 6.5 | water white |
| Example 8 | PTMP | 56.5 | XDI | 43.5 | Acetonitrile | 2 |  |  | LiSCN | 80 | ++ | 4 | water white |
| Example 9 | PTMP | 56.5 | XDI | 43.5 | Acetonitrile | 2 |  |  | LiSCN | 80 | ++ | 4.75 | water white |
| Example 10 | PTMP | 56.5 | XDI | 43.5 | Acetonitrile | 2 |  |  | NaSCN | 20 | ++++ | 9 | water white |
| Example 11 | PTMP | 56.5 | XDI | 43.5 | Acetonitrile | 2 |  |  | KSCN | 40 | ++ | 4.25 | water white |
| Example 12 | PTMP | 56.5 | XDI | 43.5 | Acetonitrile | 4 |  |  | KSCN | 40 | ++ | 4.25 | bubbles |
| Example 13 | PTMP | 56.5 | XDI | 43.5 | Acetonitrile | 6 |  |  | KSCN | 40 | +++ | 4.25 | bubbles |
| Example 14 | PTMP | 56.5 | XDI | 43.5 | MBOL | 0.5 |  |  | LiSCN | 80 | ++ | 3 | water white |
| Example 15 | PTMP | 56.5 | XDI | 43.5 | MBOL | 4 |  |  | LiSCN | 80 | ++ | 3 | water white no |
| Example 16 | PTMP | 56.5 | XDI | 43.5 | MBOL | 0.5 |  |  | LiSCN | 85.7 | ++ | 2.5 | water white |
| Example 17 | PTMP | 56.5 | XDI | 43.5 | MBOL | 0.5 |  |  | LiSCN | 90 | ++ | 2.5 | water white |
| Example 18 | PTMP | 56.5 | XDI | 43.5 | MBOL | 0.5 |  |  | LiSCN | 92 | + | 2 | water white |
| Example 19 | PTMP | 56.5 | XDI | 43.5 | MBOL | 0.5 |  |  | NaSCN | 20 | ++++ | >30 | water white |
| Example 20 | PTMP | 56.5 | XDI | 43.5 | MBOL | 0.5 |  |  | NaSCN | 40 | +++ | 5.5 | water white |
| Example 21 | PTMP | 56.5 | XDI | 43.5 | MBOL | 0.1 |  |  | NaSCN | 40 | + | 5 | water white |
| Example 22 | PTMP | 56.5 | XDI | 43.5 | MBOL | 0.5 |  |  | NaSCN | 60 | ++ | 4 | water white |
| Example 23 | PTMP | 56.5 | XDI | 43.5 | Acetonitrile | 2 | 18, crown, 7 | 0 | KSCN | 40 | +++ | 5.75 | water white |
| Example 24 | PTMP | 56.5 | XDI | 43.5 | Acetonitrile | 2 | 18, crown, 6 | 0.14 | KSCN | 40 | +++ | 5 | water white |
| Example 25 | PTMP | 56.5 | XDI | 43.5 | Acetonitrile | 2 | 18, crown, 6 | 0.25 | KSCN | 40 | +++ | 4.75 | water white |
| Example 26 | PTMP | 56.5 | XDI | 43.5 | Acetonitrile | 2 | 18, crown, 6 | 0.14 | KSCN | 60 | + | 2.5 | water white |
| Example 27 | PTMP | 56.5 | XDI | 43.5 | Acetonitrile | 2 | 18, crown, 6 | 0.25 | KSCN | 60 | − | 3 | water white |
| Example 28 | PTMP | 56.5 | XDI | 43.5 | Acetonitrile | 2 | 15, crown, 6 | 0 | LiSCN | 40 | +++ | 11.5 | water white |
| Example 29 | PTMP | 56.5 | XDI | 43.5 | Acetonitrile | 2 | 15, crown, 5 | 0.14 | LiSCN | 40 | ++ | 7.5 | water white |
| Example 30 | PTMP | 56.5 | XDI | 43.5 | Acetonitrile | 2 | 15, crown, 5 | 0.25 | LiSCN | 40 | +++ | 6.5 | water white |
| Example 31 | PTMP | 56.5 | XDI | 43.5 | Acetonitrile | 2 | 15, crown, 6 | 0 | LiSCN | 60 | +++ | 6.5 | water white |
| Example 32 | PTMP | 56.5 | XDI | 43.5 | Acetonitrile | 2 | 15, crown, 5 | 0.07 | LiSCN | 60 | +++ | 5.5 | water white |
| Example 33 | PTMP | 56.5 | XDI | 43.5 | Acetonitrile | 2 | 15, crown, 5 | 0.14 | LiSCN | 60 | ++ | 6 | water white |
| Example 34 | PTMP | 56.5 | XDI | 43.5 | Acetonitrile | 2 | 15, crown, 6 | 0 | LiSCN | 80 | ++ | 4 | water white |
| Example 35 | PTMP | 56.5 | XDI | 43.5 | Acetonitrile | 2 | 15, crown, 5 | 0.07 | LiSCN | 80 | ++ | 4 | water white |
| Example 36 | PTMP | 56.5 | XDI | 43.5 | Acetonitrile | 2 | 15, crown, 6 | 0.14 | LiSCN | 80 | + | 3.25 | water white |
| Example 37 | PTMP | 56.5 | XDI | 43.5 | Acetonitrile | 2 | 15, crown, 5 | 0.25 | LiSCN | 80 | ++ | 2.75 | water white |
| Example 38 | MDO | 48 | XDI | 52 | Acetonitrile | 6.2 |  |  | KSCN | 40 | >12 h | bubbles |  |
| Example 39 | MDO | 48 | XDI | 52 | Acetonitrile | 6.2 |  |  | KSCN | 98 | 9 | bubbles |  |
| Example 40 | MDO | 48 | XDI | 52 | Acetonitrile | 9.3 |  |  | KSCN | 145 | 2 | bubbles |  |
| Example 41 | MDO | 48 | XDI | 52 | Acetonitrile | 12.3 |  |  | KSCN | 190 | 2 | bubbles |  |

TABLE 2

|  | PREMIX 1 | | | PREMIX 2 | | |
| --- | --- | --- | --- | --- | --- | --- |
|  | XDI (g) | PTMP (g) | UV5411 (g) | PTMP (g) | MBOL (g) | LiSCN |
| Example 42 | 42.76 | 23.29 | 0.14 | 32.2 | 0.50 | 0.0080 |
| Example 43 | 42.78 | 36.33 | 0.14 | 19.1 | 0.50 | 0.0080 |
| Example 44 | 42.83 | 46.92 | 0.14 | 8.55 | 0.50 | 0.0080 |

As can be seen in table 3, the higher ratio between premix 1 and premix 2 gives better results in terms of striation.

TABLE 3

|  | Weight ratio premix 1 over premix 2 | Ratio NCO/SH | Striation | Gel time |
| --- | --- | --- | --- | --- |
| Example 42 | 2.0 | 1.00 | ++++ | 4.5 |
| Example 43 | 4.0 | 1.00 | +++ | 4.75 |
| Example 44 | 9.9 | 1.00 | ++ | 4.5 |

EXAMPLE 45 premix formulation as in example 38 was prepared but instead of using a mechanical stirred reactor, a static mixer is used.

In term of striation, the result is not as good as the mechanical stirring.

EXAMPLE 46

To improve upon the result obtained in example 41, the internal elements of the static mixer were connected to a motor. In this case, the mixing device acts like a screw mixer, the result is very good and only minor striations are obtained (note +).

EXAMPLE 47

Bis(β-epithiopropyl)sulfide (100 parts by weight) is mixed with 600 ppm of KSCN and 0.75 parts by weight of 15, crown, 5.

The polymerization proceeds at room temperature in 6 to 21 hours.

EXAMPLES 48 to 52

These examples illustrate the use of different electro-donor compounds as polymerization promoter.

Potassium thiocyanate salt dissolved in 0.1 g of acetonitrile and the electro-donor compound were added and mixed to the thiol monomer.

After 30 seconds of mixing, the isocyanate monomer was added and the gel time was recorded by following temperature due to exothermic reaction.

Compositions and results are given in Table 4.

TABLE 4

|  | Thiol | g | Isocyanate | g | Solvent | g | Catalyst | ppm | Electro-donor compound | ppm | Gel time (s) |
| --- | --- | --- | --- | --- | --- | --- | --- | --- | --- | --- | --- |
| Example 48 | MDO | 48 | XDI | 52 | Acetonitrile | 0.1 | KSCN | 140 | 15.5 crown ether | 1550 | 150 |
| Example 49 | MDO | 48 | XDI | 52 | Acetonitrile | 0.1 | KSCN | 140 | 15.5 crown ether | 960 | 174 |
| Example 50 | MDO | 49 | XDI | 53 | Acetonitrile | 0.1 | KSCN | 100 | 15.5 crown ether | 430 | 254 |
| Example 51 | MDO | 49 | XDI | 53 | Acetonitrile | 0.1 | KSCN | 100 | 2,2,2 Kryptan | 400 | 134 |
| Example 52 | MDO | 49 | XDI | 53 | Acetonitrile | 0.1 | KSCN | 100 | Tributyl phosphite | 400 | 180 |

EXAMPLES 53 TO 57

In these examples KSCN catalyst has been replaced by different salt catalysts according to the invention. Compositions and results are given in Table 5.

TABLE 5

|  | Thiol | g | Isocyanate | g | Solvent | g | Catalyst | ppm | Electro-donor compound | ppm | Gel time (s) |
| --- | --- | --- | --- | --- | --- | --- | --- | --- | --- | --- | --- |
| Example 53 | PTMP | 56.5 | XDI | 43.5 | Acetonitrile | 0.1 | Th(acac) | 90 | — | — | 254 |
| Example 54 | MDO | 48 | XDI | 52 | Acetonitrile | 0.1 | NaBz | 75 | 15.5 crown ether | 620 | 3600 |
| Example 55 | MDO | 48 | XDI | 53 | Acetonitrile | 0.1 | NaBz | 125 | 15.5 crown ether | 760 | Instantaneous |
| Example 56 | MDO | 48 | XDI | 53 | Acetonitrile | 0.1 | Kform | 87 | 15.5 crown ether | 520 | 3600 |
| Example 57 | MDO | 48 | XDI | 53 | Acetonitrile | 0.1 | Kform | 125 | 15.5 crown ether | 800 | Instantaneous |

Th(acac): Thallium acetylacetonate
Kform: Potassium formate
NaBz: Sodium benzoate

EXAMPLES 58 TO 69

This examples show the episulfide polymerization of a composition disclosed in example 12 of EP-921 417 but using the polymerization catalysts of the present invention.

In a vial 90 g of Bis(β-epithiopropyl) sulfide is mixed with with 5 g 2-hydroxy-3-phenoxypropyl acrylate at room temperature.

In another vial we add 5 g of bis(ethanethiol)-2-2'-sulfide (DMDS) and the requested amount of salt catalyst is added with electro-donor compound and solvent as shown in Table 6.

The two premixes are mixed at room temperature and gel times were also recorded and are given in Table 6.

A thermal cycle of 3 hours at 100° C. was then used to achieve the reaction.

Clear hard samples were obtained.

TABLE 6

| | | Example | | | | | | | | | | | |
|---|---|---|---|---|---|---|---|---|---|---|---|---|---|
| | | 58 | 59 | 60 | 61 | 62 | 63 | 64 | 65 | 66 | 67 | 68 | 69 |
| Bis(β-epithiopropyl)sulfide | g | 90 | 90 | 90 | 90 | 90 | 90 | 90 | 90 | 90 | 90 | 90 | 90 |
| 2-hydroxy-3-phenoxypropyl acrylate | g | 5 | 5 | 5 | 5 | 5 | 5 | 5 | 5 | 5 | 5 | 5 | 5 |
| Bis(ethanethiol,2,2') sulfide | g | 5 | 5 | 5 | 5 | 5 | 5 | 5 | 5 | 5 | 5 | 5 | 5 |
| Tetrahydrofurane | g | 0.1 | 0.1 | 0.1 | 0.1 | 0.1 | 0.1 | 0.1 | 0.1 | 0.1 | 0.1 | | |
| 15,5 crown ether | g | | | | | | | | | | | 0.1 | 0.1 |
| 2,2,2 kryptan | g | 0.20 | 0.40 | 0.30 | 0.30 | 0.20 | 0.30 | 0.40 | 0.40 | 0.30 | 0.20 | | |
| Potassium acetate | PPM | 399.04 | 497.76 | 498.26 | 498.26 | 498.75 | 548.05 | 597.25 | 597.25 | 297.85 | 598.44 | | |
| Tetrabutylamonium acetate | PPM | | | | | | | | | | | 208 | |
| Potassium thioactate | PPM | | | | | | | | | | | | 20 |
| Gel time (min) | min | 57 | 23 | 38 | 43 | 42 | 33 | 21 | 21 | 33 | 38 | 180 | 180 |

Examples of pKa (acid/base) corresponding to the salt catalysts of the examples are given below:

| ACID | ANION | pKa |
|---|---|---|
| HSCN | SCN$^\ominus$ | 0.85 |
| HCOOH | HCOO$^\ominus$ | 3.8 |
| C$_6$H$_5$COOH | C$_6$H$_5$COO$^\ominus$ | 4.2 |
| CH$_3$COOH | CH$_3$COO$^\ominus$ | 4.8 |
| C$_6$H$_5$SH | C$_6$H$_5$S$^\ominus$ | 7.8 |
| CH$_3$COCH$_2$COCH$_3$ | CH$_3$CO$^\ominus$CHCOCH$_3$ | 9 |

What is claimed is:

1. Polymerizable composition for making thio containing resins comprising,
   A) at least one polyisocyanate or polyisothiocyanate monomer and at least one polythiol or at least one episulfide compound and optionally one or more compounds having two or more functional groups capable of reacting with episulfide groups; and
   B) a polymerization catalyst, wherein the polymerization catalyst comprises an effective amount of at least one salt of formula:

wherein
   $M^{P+}$ is a cation selected from the group consisting of alkaline metals, alkaline earth metals, transitions metals and ammonium groups of formula $NR^+_4$ in which R is an alkyl radical,
   $Y^-$ is an anion such as the corresponding acid YH has a pKa fulfilling the condition $0.5 \leq pKa \leq 14$ with the proviso that when the polymerizable compositions comprise an episulfide compound and $M^{P+}$ is an ammonium group, the polymerizable composition also comprises an electro-donor compound,
   p is the valency of the cation, and
   n=m×p.

2. Polymerizable composition according to claim 1, wherein the associated acid YH has a pKa fulfilling the condition $0.5 \leq pKa \leq 8$.

3. Polymerizable composition according to claim 1, wherein $Y^-$ is selected from the group consisting of thiocyanate, carboxylate, thiocarboxylate, RS$^-$ wherein R is a substituted or non-substituted alkyl group or phenyl group, acetylacetonate, diketone, acetoacetic ester, malonic ester, cyanoacetic ester, and ketonitrile.

4. Polymerizable composition according to claim 1, wherein the cation $M^{P+}$ is selected from the group consisting of Li$^+$, Na$^+$, K$^+$, Rb$^+$, Mg$^{2+}$, Ca$^{2+}$, Ba$^{2+}$ and Al$^{3+}$.

5. Polymerizable composition according to claim 1, wherein the ammonium groups $NR^{+4}$, the alkyl radicals R are selected from the group consisting of $C_1$–$C_8$ alkyls.

6. Polymerizable composition according to claim 1, wherein the alkyl radicals R are selected among methyl, ethyl, propyl, butyl and hexyl radicals.

7. Polymerizable composition according to claim 1, wherein the catalyst is present in an amount of 5 to 1000 parts per million (ppm), based on the total weight of the polymerizable monomers present in the composition.

8. Polymerizable composition according to claim 1, further comprising an electrodonor compound enhancing the reactivity of the polymerization reaction.

9. Composition according to claim 8, wherein the electrodonor compound is selected from the group consisting of acetonitrile compounds, amide compounds, sulfones and sulfoxides, trialkylphosphites, nitro compounds, ethyleneglycol ethers, crown ethers and kryptates.

10. Composition according to claim 9, wherein the crown ether and the kryptate are selected from the compounds of formulae:

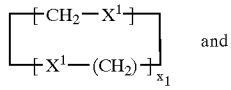

and

-continued

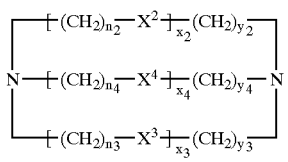
(VIII)

wherein $X^1$ represents O, S or NH, $x_1$ is an integer from 3 to 6, $X^2$, $X^3$ and $X^4$ represent O or S, $n_2$, $n_3$, $n_4$, $y_2$, $y_3$, $y_4$ are 2 or 3, and $x_2$, $x_3$, $x_4$, are 2 or 3.

11. Composition according to claim 9, wherein the electro-donor compound represents up to 5% by weight of the total weight of the polymerizable monomers present in the composition.

12. Composition according to claim 1, further comprising a solvent.

13. Composition according to claim 12, wherein the solvent is a polar organic solvent.

14. Composition according to claim 12, wherein the solvent is a reactive solvent containing one hydroxyl function, one double bond and one hydrogen labile function.

15. Composition according to claim 12, wherein the solvent represents up to 2% by weight, based on the total weight of the polymerizable monomers.

16. Composition according to claim 1, wherein the polyisocyanate and the polyisothiocyanate monomers are selected from the compounds having the formulae:

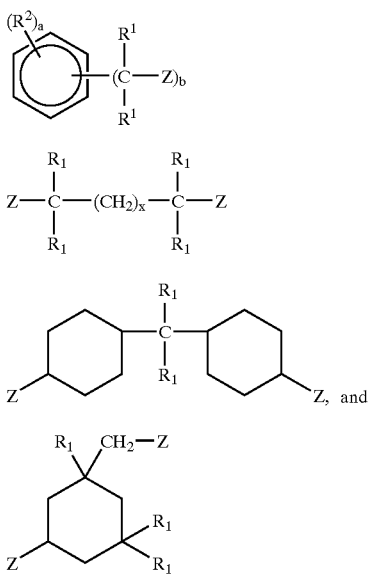

wherein
$R^1$ is independently H or a $C_1C_5$ alkyl group;
$R^2$ is H, an halogen, or a $C_1C_5$ alkyl group;
Z is —N=C=O or —N=C=S;
a is an integer ranging from 1 to 4, b is an integer ranging from 2 to 4 and $a+b \leq 6$; and
x is an integer from 1 to 10.

17. Composition according to claim 13, wherein the polyiso(thio)cyanate monomers are selected from the group consisting of tolylene diiso(thio)cyanate, phenylene diiso(thio)cyanate, ethylphenylene diiso(thio)cyanate, isopropyl phenylene diiso(thio)cyanate, dimethylphenylene diiso(thio)cyanate, diethylphenylene diiso(thio)cyanate, diisopropylphenylene diiso(thio)cyanate, trimethylbenzyl triiso(thio)cyanate, xylylene diiso(thio)cyanate, benzyl triiso(thio)cyanate, 4,4'-diphenyl methane diiso(thio)cyanate, naphtalene diiso(thio)cyanate, isophorone diiso(thio)cyanate, bis(iso(thio)cyanate methyl) cyclohexane, hexamethylene diiso(thio)cyanate and dicyclohexylmethane diiso(thio)cyanate and mixtures thereof.

18. Composition according to claim 1, wherein the polyiso(thio)cyanate monomer or the mixture thereof represents 30 to 70% by weight of the total weight of the polymerizable monomers present in the composition.

19. Composition according to claim 1, wherein the polythiol has formula:

$$R^1(SH)_{n^1}$$

in which $n^1$ is an integer from 2 to 6 and $R^1$ is an organic group of valency equal to $n^1$.

20. Composition according to claim 1, wherein the polythiol represents 30 to 70% by weight of the total weight of the polymerizable monomers present in the composition.

21. Composition according to claim 1, wherein the salt catalyst or mixture thereof is the sole polymerization catalyst present in the composition.

22. Composition according to claim 1, wherein the composition is a two-component polymerizable composition.

23. Composition according to claim 22, wherein the two component polymerizable composition comprises a first premix containing:
the totality of the polyiso(thio)cyanate monomer and optionally
part or the totality of the polythiol monomer;
a UV absorber; and
a mold release agent; and
a second premix containing:
the salt catalyst as defined in claim 1; and eventually
part or the totality of the polythiol monomer;
a solvent and/or
an electrodonor compound.

24. Composition according to claim 23, wherein first premix contains, in part by weight:
40–100 of a polyiso(thio)cyanate monomer,
0–60 of a polythiol monomer;
0–0.3 of a UV absorber; and
0–0.2 of an internal mold release agent; and second premix contains, in part by weight:
0–100 of a polythiol monomer;
0–1 of a solvent;
0.001 to 0.01 of a salt catalyst as defined in claim 1; and
0–5 of an electro-donor compound.

25. Cast article made of a polyurethane resin made of a composition according to anyone of claims 1 to 24 fully polymerized.

26. Process for making a cast polyurethane resin article, characterized in that it comprises:
preparing a first premix and a second premix as set forth in claim 23;
mixing the first premix and the second premix at room temperature in appropriate quantities;
filling a mold with the mixed quantities of first and second premix and maintaining at room temperature until a hard gel is formed; thereafter curing the filled mold in an oven at an elevated temperature until complete polymerization; and removing the cast article from the mold.

27. Process according to claim 26, wherein the weight ratio of first premix over second premix ranges from 4 to 10.

28. Process according to claim 26 wherein mixing time of the first and second premix ranges from 10 to 180 seconds.

29. Process according to claim 26, wherein curing is effected at a temperature ranging from 50 to 150° C. for 2 to 4 hours.

30. Process according to claim 26, wherein cast article is an optical article.

31. Polymerizable composition comprising at least one episulfide compound and, as polymerization catalyst, an effective amount of at least one salt of formula:

$$M_m^{P+}Y_n^-$$

wherein $M^{P+}$ is a cation selected from the group consisting of alkaline metals, alkaline earth metals, transitions metals and ammonium groups of formula $NR^+_4$ in which R is an alkyl radical, $Y^-$ is an anion such as the corresponding acid YH has a pKa fulfilling the condition $0.5 \leq pKa \leq 14$ the with proviso that when the polymerizable compositions comprise an episulfide compound and $M^{P+}$ is an ammonium group, the polymerizable composition also comprises an electro-donor compound, p is the valency of the cation, and n=m×p.

32. Polymerizable composition according to claim 31, wherein the at least one episulfide compound represents 100% by weight of the polymerizable monomers present in the composition.

33. Polymerizable composition according to claim 31, further comprising a polythiol.

34. Polymerizable composition according to claim 31, further comprising a crown ether.

* * * * *